United States Patent
Haaland

Patent Number: 6,126,869
Date of Patent: Oct. 3, 2000

[54] SOLAR BLIND OPTICAL FILTER

[75] Inventor: Peter D. Haaland, Louisville, Colo.

[73] Assignee: Mobium Enterprises, Inc., Louisville, Colo.

[21] Appl. No.: 09/353,436

[22] Filed: Jul. 15, 1999

Related U.S. Application Data

[60] Provisional application No. 60/092,925, Jul. 15, 1998.

[51] Int. Cl.[7] .................. F21V 9/04; G02B 5/22
[52] U.S. Cl. ............ 252/589; 252/588; 359/885; 359/886; 359/361
[58] Field of Search ..................... 252/589, 588; 359/885, 886, 361

[56] References Cited

U.S. PATENT DOCUMENTS

| | | | |
|---|---|---|---|
| 4,317,751 | 3/1982 | Kraushaar | 252/589 |
| 4,521,301 | 6/1985 | Detienne et al. | |
| 4,597,629 | 7/1986 | Kraushaar | 252/588 |
| 4,731,881 | 3/1988 | Geller | 252/589 |
| 4,793,668 | 12/1988 | Longstaff | 359/885 |
| 4,795,461 | 1/1989 | Lindqvist et al. | |
| 4,885,114 | 12/1989 | Gordon et al. | |
| 5,021,668 | 6/1991 | Talmore et al. | |
| 5,066,082 | 11/1991 | Longstaff | 359/885 |
| 5,574,286 | 11/1996 | Huston et al. | |

Primary Examiner—Philip Tucker
Attorney, Agent, or Firm—Thompson Hine & Flory LLP

[57] ABSTRACT

A solar blind optical filter which absorbs solar UV radiation and transmits non-solar UV radiation includes a carrier material and a salt of a dithioic acid of the formula $RCS_2^- X^+$ wherein R is an a organic substituent that does not absorb ultraviolet light at wavelengths between 260 nanometers and 300 nanometers and X is a counterion. The solar blind optical filters of the present invention are useful for observing non-solar ultraviolet radiation in the presence of solar radiation.

20 Claims, 5 Drawing Sheets

Dye filter assembly with 2% by weight t-BusCS$_2$ piperidine salt in polyvinyl alcohol Dye filter assembly with 2% by weight t-BusCS₂ piperidine salt in polyvinyl alcohol

Thermal stability test of a 2% by weight dye filter using $iPrCS_2^-\ N(C_2H_5)_4^+$ and polyvinylalcohol.

Absorption spectrum of iPrCS$_2^-$ N(C$_2$H$_5$)$_4$ in aqueous solution before and after 24 hours of heating at 95°C.

SOLAR BLIND OPTICAL FILTER

CROSS-REFERENCE TO RELATED APPLICATION

This application claims priority from U.S. Provisional Patent Application No. 60/092,925, filed Jul 15, 1998.

BACKGROUND

This invention relates to solar blind optical filters and, more particularly, to dye compounds used in such filters.

Many important phenomena produce ultraviolet radiation including fires, rocket and jet engine exhausts, electrical discharges on high tension wires, lightning, and the plasma surrounding an object that is entering the earth's atmosphere at a high velocity. Photons of ultraviolet radiation are more energetic than photons of visible light and are therefore easier to detect. There are many sensors that detect UV radiation including photodiodes, photomultipliers, charge-coupled device (CCD) arrays, and other light sensors familiar to those practiced in the art of optical detection. The sensors typically respond to light over a range or spectral band of wavelengths.

The detection of an ultraviolet emission source such as a fire or rocket plume during the day is complicated by ultraviolet light that is emitted by the sun and only partly absorbed by the atmosphere. FIG. 1 shows the solar radiation or actinic flux, $A(\lambda)$, that is observed under typical conditions at sea level. If the response of the detector is $S(\lambda)$, then this actinic flux B will give a uniform background signal that is the integral of these two functions over wavelength according to the following equation:

$$B = \int S(\lambda) A(\lambda) d\lambda \quad (1)$$

The ultraviolet signal, T from the target process is a similar integral where $A(\lambda)$ is now replaced by the wavelength-dependent target emission $E(\lambda)$. Equation (1) then becomes:

$$T = \int S(\lambda) E(\lambda) d\lambda. \quad (2)$$

A useful figure of merit for a detection of a target process is the ratio of target signal to background, T/B. Sensors that provide high values for the ratio T/B are known as solar blind detectors. Qualitatively, one sees that this ratio is maximized when the actinic flux is completely excluded from the sensor since the value of B approaches zero.

As is seen in FIG. 1, the actinic flux increases very rapidly as $\lambda$ increases beyond 285 nm. Although the sun emits a large quantity of radiation at these wavelengths, such radiation is efficiently absorbed by the atmosphere, specifically by $O_3$ in the stratosphere.

Current solar blind filters include dielectric stack filters such as those manufactured by Corion of Holliston, Mass. or Plummer Precision Optics of Boston, Mass. Dielectric stack filters can have a very rapid change of filter transmission with wavelength, however, the range of wavelengths which is transmitted varies rapidly with the angle of incidence and polarization of the incoming light. These constraints reduce the figure of merit T/B for many applications. Furthermore, the peak transmission of these dielectric stacks is typically less than 30%, so that T is less than ideal for stack filters.

Another known filter material uses absorbing dye materials such as those sold by Ofil, Ltd. of Israel. Dye molecules have the advantage that their optical transmission is independent of the incident angle and polarization of solar radiation. However, dye materials that absorb well at around 300 nm but then rapidly become transparent as the energy of the photon increases are rare. This is a fundamental consequence of the quantum electronic structure of materials, familiar to those practiced in the art of physical chemistry. The design issue for dyes is therefore to minimize transmission of background radiation B while retaining enough target radiation T (see equation (2)) to detect the target signal.

The actinic flux is computed from the sum of the direct, attenuated solar beam plus angularly integrated scattered radiation using the U.S. Standard Atmosphere (1976) and a solar zenith angle of 30°. The variation of actinic flux with season, zenith angle, weather conditions, and latitude is familiar to those practiced in the art of aeronomy.

SUMMARY OF THE INVENTION

The present invention is a solar blind optical filter assembly having a class of dye materials which maximizes transmission of target radiation while minimizing transmission of solar or actinic radiation. In a preferred embodiment of the invention, the filter employs a class of dye materials consisting of salts of simple dithioic acids, $RCS_2^- X^+$, where R is an organic fragment and X is a counterion, neither of which absorbs radiation between 260 nm and 300 nm. The chromophore or light-absorbing moiety of these compounds is the dithioic acid anion $RCS_2^-$, so that their transmissive properties are not sensitive to the composition of the counterion $X^+$.

By way of example and not of limitation, dye materials of the present invention include salts of dithioic acids having the form $RCS_2^- X^+$ wherein $R=CH_3$, H, $C_2H_5$, iPr, tBu and $X=Na$, $N(C_2H_5)_4$, and $C_5H_{10}NH_2$ (piperidine). Similar spectra are found with slight shifts as the substituent R is varied or the solvent is changed, as will be familiar to those practiced in the art of organic chemistry. Variation of the counterion primarily influences the solubility of the dye in the selected solvent or matrix, and secondarily influences the thermal and chemical stability of the dye material. For example, sodium salts are typically more sensitive to oxidation than the corresponding tetraalkylammonium salts.

The synthesis of dithioic acid salts is familiar to those practiced in the art of organic chemistry. For example, such a process is described in Kato et al., *Z. Naturforsch.* 33b, 976–7, 1978 the disclosure of which is incorporated herein by reference. Other methods of synthesizing are described in D. Paquer, *Bull Chem. Soc. Fr.*, 1439 (1975); and E. Jansons, *Russ. Chem. Rev.*, 45, 1035 (1976), the disclosures of which are incorporated herein by reference. Viable synthetic options include reduction of $CS_2$ by an alkyl Grignard or alkyl lithium reagent, thiolysis of precursors such as $CF_3CN$, or oxidative sulphuration of aromatic aldehydes. The last method is of limited utility for solar blind dyes since the aromatic moiety absorbs ultraviolet radiation and is thus an unsuitable choice for R.

The dye material may be placed in the optical path of a UV detector in varied forms including as a liquid solution or as a polymeric film in which the dye is dissolved before it is cast. Alternatively, the dye may be immobilized on transparent media. The dye may be adsorbed onto silica nanospheres (available from Bangs Laboratories, Indianapolis, Ind.) or immobilized in a gel or glass matrix. The dye materials are soluble in water, alcohol, dichloromethane, and many other polar and organic solvents.

Accordingly, it is an object of the present invention to provide a solar blind optical filter for light going into a broad-band sensor such as a CCD camera, photodiode, or photomultiplier so that the sensor can detect non-solar ultraviolet radiation in the presence of solar radiation; an optical filter utilizing a new class of dye materials whose electronic structure facilitates strong absorption of solar UV radiation while retaining high transmission for non-solar UV radiation; and to provide a dye filter which is simple, inexpensive, and chemically and thermally stable for extended periods of time.

Other objects and advantages of the present invention will be apparent from the following description, the accompanying drawings and the appended claims.

DETAILED DESCRIPTION

Figure 2:
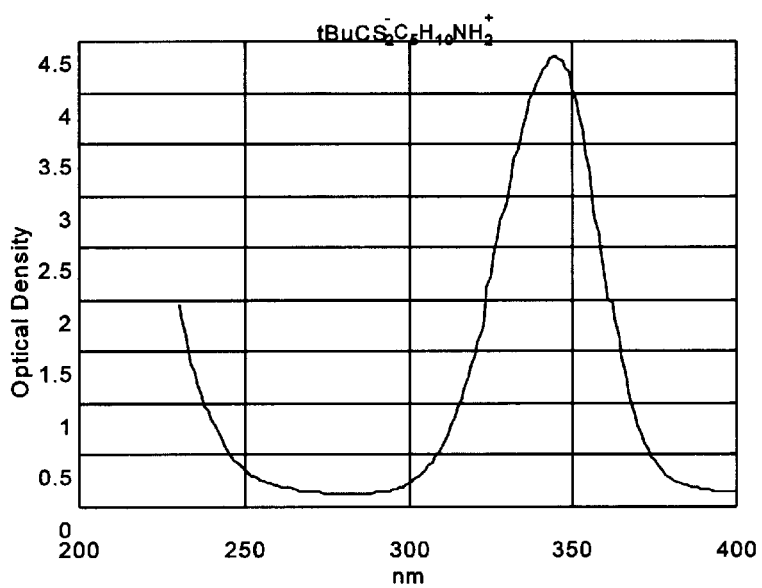
FIG. 2 is a plot of the absorption spectrum for a preferred embodiment of the dye filter assembly of the present invention with 2% by weight t-$BuCS_2$ piperidine salt in polyvinyl alcohol.

FIG. 2 shows the absorption spectrum of the tertiary butyl dithioic acid dye with a piperidinyl counterion, t-$BuCS_2^-$ $C_5H_{10}NH_2^+$, as cast in a 1 mil polyvinylalcohol film. As can be seen from the spectrum, there is minimal absorption below 300 nm and high optical density where solar flux is significant. The abscissa of FIG. 2 has units of optical density (OD), which are defined as minus the common logarithm of the ratio of transmitted to incident intensities. The film shown transmits over 90% of the light from 270 to 300 nm but transmits less than 0.003% of 345 nm light.

Figure 1:
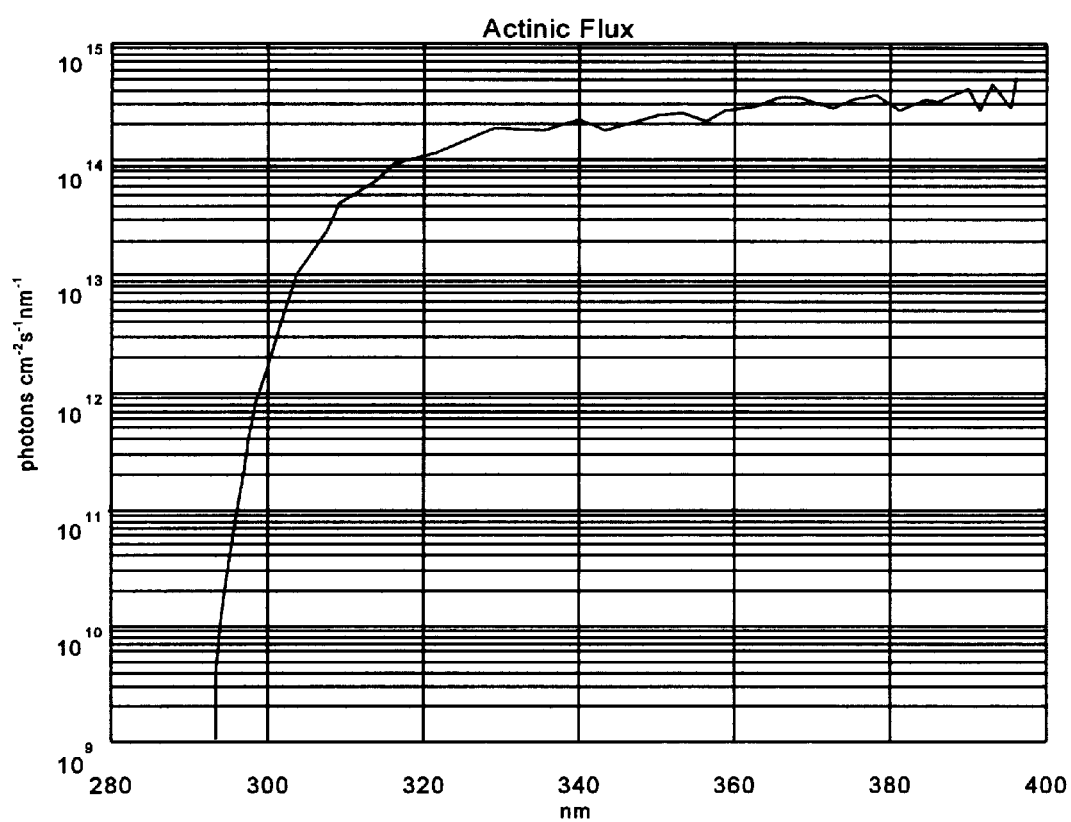
FIG. 1 is a plot of actinic flux at sea level.
Figure 3:
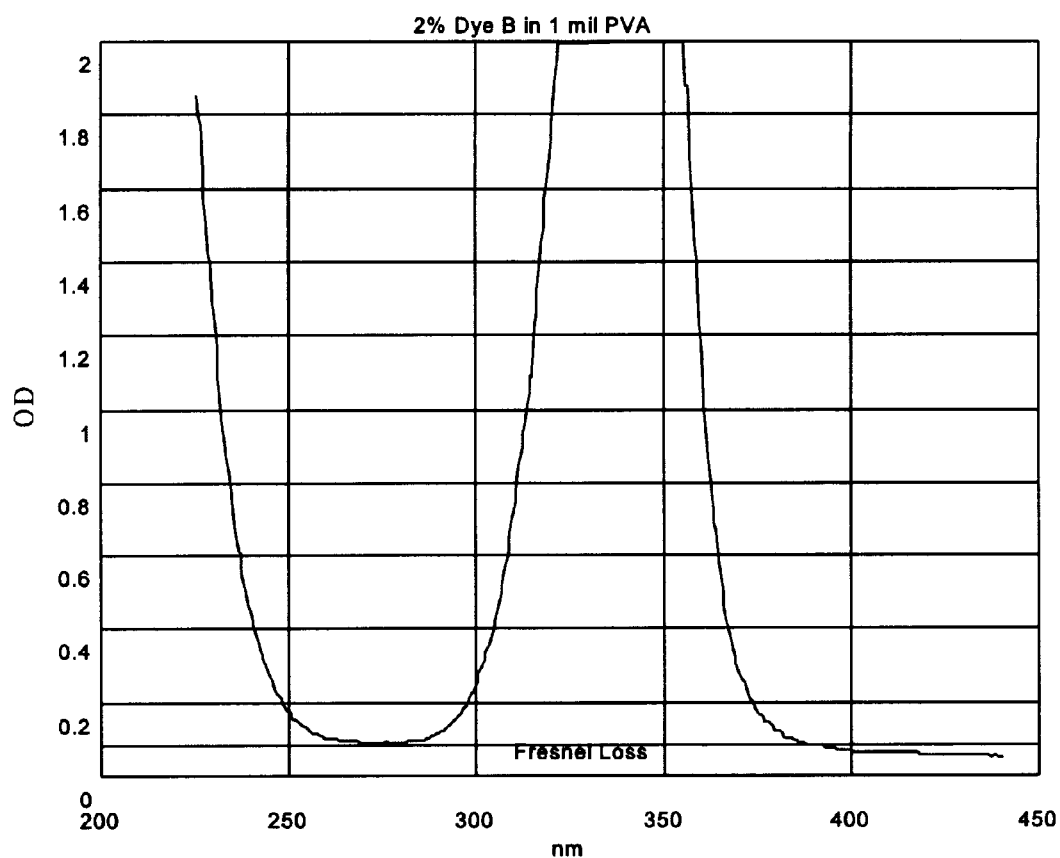
FIG. 3 is a plot of the absorption spectrum for an alternate embodiment of the dye filter assembly of the present invention with 2% by weight $iPrCS_2N(C_2H_5)_4$ in polyvinyl alcohol.

A second dye film with R=iPr (iPr=isopropyl) and X=N $(C_2H_5)_4$ is shown in FIG. 3. This dye has a similar spectrum to that of FIG. 2, but its peak optical density occurs at 11 nm shorter wavelength (333 nm versus 344 for FIG. 1). Also shown in FIG. 3 is the reduction in transmission due to Fresnel reflection from the two air-film interfaces. As can be seen by inspection of FIG. 3, this dye material has a better value of T/B than the t-Bu derivative for most detectors because its negligible absorbance between 260 and 280 nm drives the value of B to zero in Equation (2). The peak optical density of the film shown in FIG. 3 is about 7, so that nearly 100% of the light between 260 and 290 nm is transmitted while the transmission at 333 nm is 0.000001%.

Figure 4:
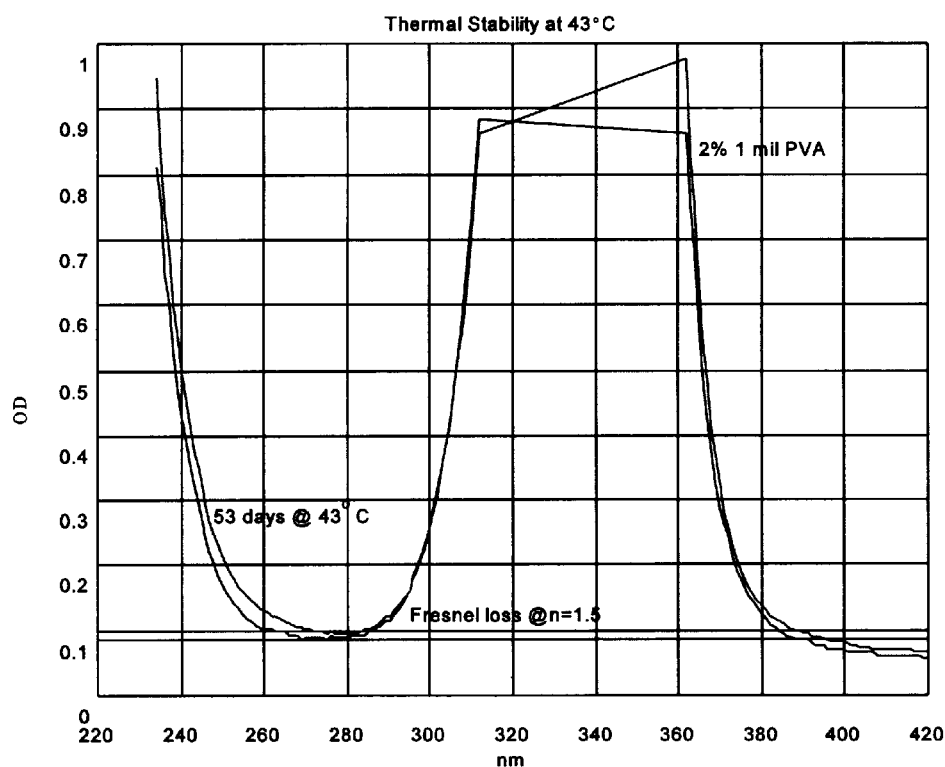
FIG. 4 shows the thermal stability of an alternate embodiment of a 2% by weight dye filter using $iPrCS_2N(C_2H_5)_4$ in polyvinyl alcohol.

For practical applications of solar blind optical filters it is necessary that the dye be chemically and thermally stable. FIG. 4 shows two absorption spectra of the $iPrCS_2N(C_2H_5)_4$ dye in polyvinylalcohol after preparation and following 53 days of heating under nitrogen at 43° C. There is no change to the spectrum within the uncertainty of the spectrophotometer measurements, proving that this dye material is thermally stable.

Figure 5:
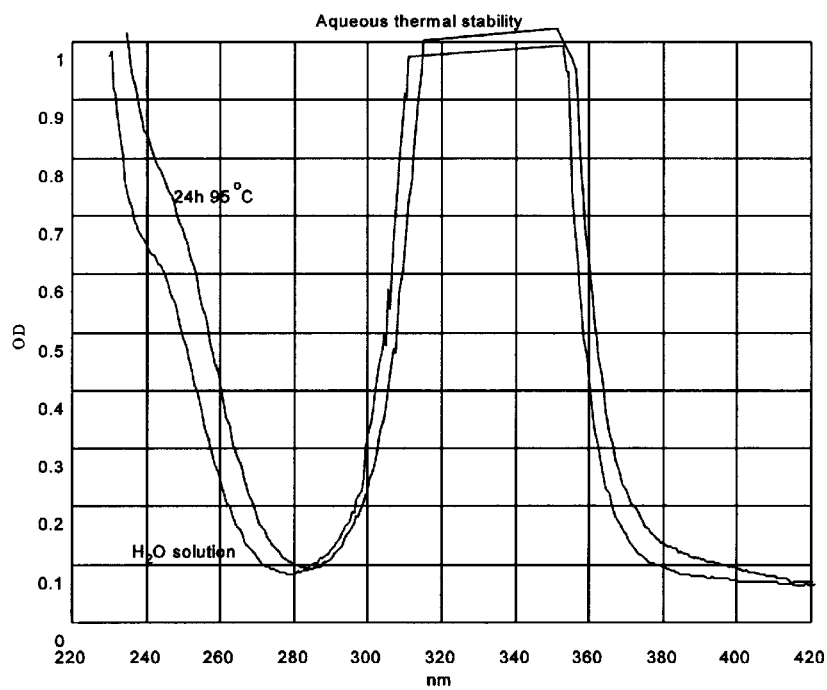
FIG. 5 shows the absorption spectrum of $iPrCS_2N(C_2H_5)_4$ in aqueous solution before and after 24 hours of heating at 95° C.

A second test of thermal and chemical stability shown in FIG. 5 reveals minimal changes to the absorption spectrum of an aqueous dye solution that was held at 95° C. for 24 hours.

The fundamental solar blinding characteristics of the invention are not strongly influenced by the chemical nature of the R or X groups as long as these do not absorb light in the region of chromophore transparency between 260 and 300 nm.

The dithioacid salt dyes may be used in combination either in discrete films or solutions or as a mixture dissolved in a single matrix or solution to improve the shape of the absorbance profile for particular applications.

The invention is not limited to the compositions described herein, and other compositions are possible within the purview of the claimed invention. It is therefore to be understood that, within the scope of the appended claims, the invention may be practiced other wise than as specifically described.

I claim:

1. A solar blind optical filter comprising a carrier material containing a salt of a dithioic acid of the formula $RCS_2^-X^+$, wherein R is an organic substituent that does not absorb ultraviolet light at wavelengths between 260 nanometers and 300 nanometers and X is a counterion.

2. The solar blind optical filter of claim 1 wherein R is alkyl or substituted alkyl.

3. The solar blind optical filter of claim 2 wherein R contains one to four carbon atoms.

4. The solar blind optical filter of claim 3 wherein R is isopropyl.

5. The solar blind optical filter of claim 1 wherein said counterion is selected from the group consisting of Na, $N(C_2H_5)_4$ and $C_5H_{10}NH_2$.

6. The solar blind optical filter of claim 1 wherein said carrier material is selected from the group consisting of water, solvent, polymeric film and solid media.

7. The solar blind optical filter of claim 6 wherein said polymeric film is polyvinylalcohol.

8. The solar blind optical filter of claim 7 wherein R is isopropyl.

9. The solar blind optical filter of claim 8 wherein said counterion is $NR_4^+$ where R is an organic substituent that does not absorb light between wavelengths of 260 nm and 300 nm.

10. The solar blind optical filter of claim 9 wherein said counterion is $N(C_2H_5)_4$.

11. The solar blind optical filter of claim 10 wherein said salt of a dithioic acid is $(CH_3)_2CHCS_2^-N(C_2H_5)_4^+$.

12. The solar blind optical filter of claim 6 wherein said solvent is ethanol, ethylene glycol or combinations thereof.

13. The solar blind optical filter of claim 6 wherein said solid media is glass, alumina or silica microspheres.

14. The solar blind optical filter of claim 1 wherein said salt of a dithioic acid is present in said carrier material at a concentration of between about 0.5% and 10% based on weight.

15. The solar blind optical filter of claim 14 wherein said salt of a dithioic acid is present in said carrier material at a concentration of about 5% by weight.

16. A solar blind optical filter which absorbs solar UV radiation and transmits non-solar UV radiation comprising a carrier material and a salt of a dithioic acid said salt of a dithioic acid being of the formula $RCS_2^{-X+}$ wherein R is any moiety that does not absorb UV radiation between about 260 nm and 300 nm and X is a counterion.

17. A solar blind optical filter which absorbs solar UV radiation and transmits non-solar UV radiation comprising:
a carrier material selected from the group consisting of water, solvent, polymeric film and solid media; and
a salt of a dithioic acid of the formula $RCS_2^{-X+}$, wherein R is alkyl or substituted alkyl containing one to four carbon atoms, and X is a counterion selected from the group consisting of Na, $N(C_2H_5)_4$ and $C_5H_{10}NH_2$.

18. The solar blind optical filter of claim 17 wherein said salt of a dithioic acid is $(CH_3)_2CHCS_2^-N(C_2H_5)_4^+$.

19. The solar blind optical filter of claim 17 wherein said filter has the following transmission characteristics: the transmission (T)

is less than 0.005% at 345 nm, and is at least 90% between 270 nm and 300 nm.

20. A method for filtering solar radiation from a combination of solar and non-solar radiation sources, comprising the steps of:

(a) providing a solar blind optical filter including a carrier material containing a salt of a dithioic acid of the formula $RCS_2^-X^+$, wherein R is an organic substituient that does not absorb ultraviolet light at wavelengths between 260 nanometers and 300 nanometers and X is a counterion; and (b) positioning the solar blind optical filter in the path of the solar and non-solar radiation sources.

* * * * *